3,200,526
PICTURE FRAME CONSTRUCTION
Ben Munn, Hollis, N.Y., assignor to APF Inc., New York, N.Y., a corporation of New York
Filed May 1, 1963, Ser. No. 277,168
1 Claim. (Cl. 40—152)

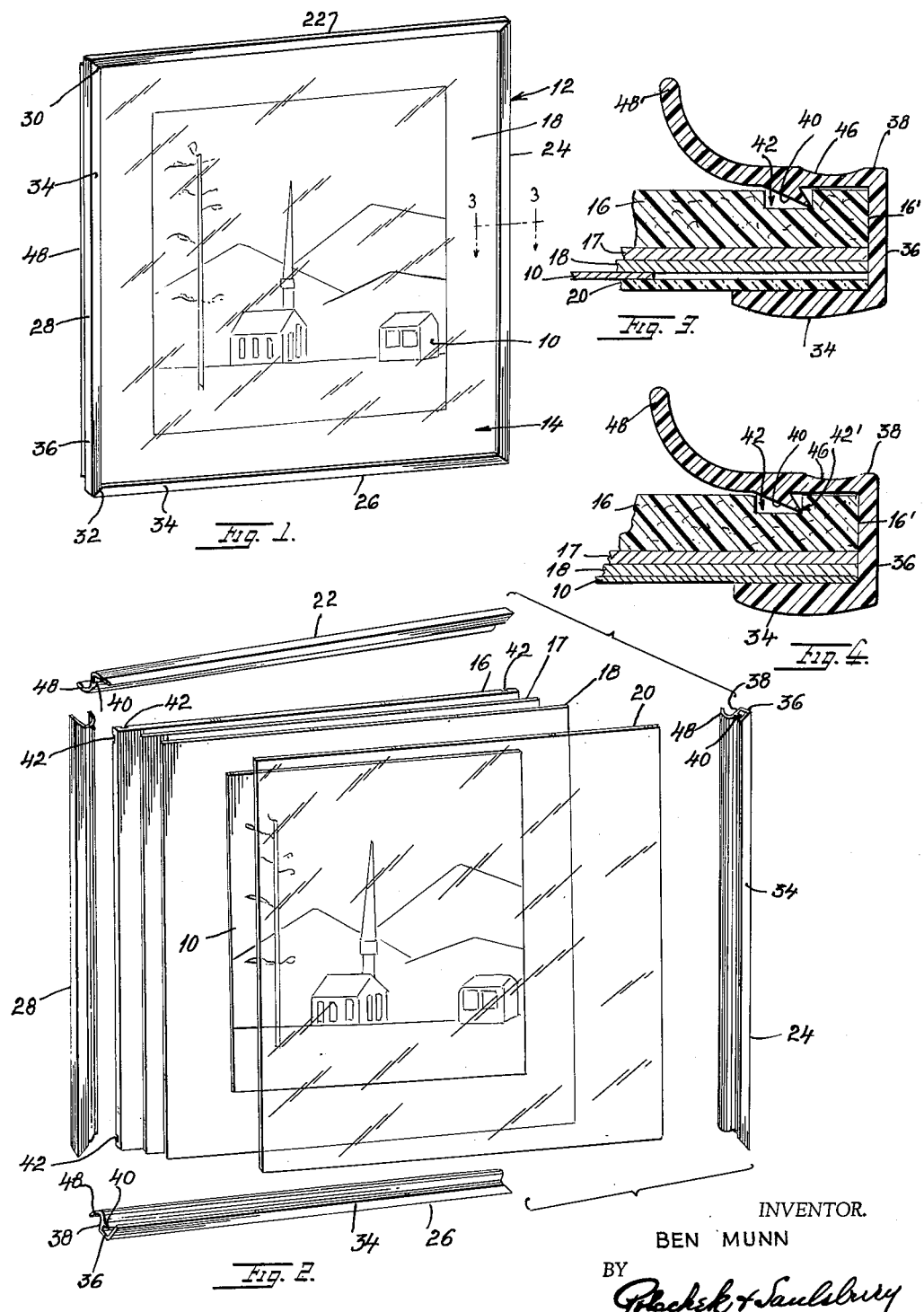

This invention relates to new and useful improvements in picture frames and mountings therefor.

A principal object of the present invention is to provide a picture frame that serves not only as a support for a picture but as a mechanical clamp for the entire picture mount assemblage and as a marginal decoration.

Another object of the invention is to provide a picture frame with means for spacing the picture frame and picture mount assemblage away from the adjacent supporting wall.

A further object is to provide a picture frame that is inherently flexible so as to facilitate mounting and detaching the picture frame on and from the picture mount assemblage.

An important object of the invention is to provide a picture frame and mount combination which can be assembled, disassembled and reassembled by the user with little effort and without the use of tools, or materials, thus avoiding expense to the user.

Yet another object is to provide a picture frame and mount combination which provides a dust-proof structure that precludes the entry of dust or foreign particles into the picture mount assemblage.

It is also an object of the invention to provide a picture frame that is pleasing in appearance, simple in construction and that can be manufactured and sold at a reasonable cost.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

FIG. 1 is a front perspective view of a picture frame and mount embodying the invention, a picture being shown supported therein.

FIG. 2 is an exploded perspective view thereof.

FIG. 3 is an enlarged cross-sectional view taken on the line 3—3 of FIG. 1.

FIG. 4 is a view similar to FIG. 3, showing the invention applied to a different picture mount assemblage.

Referring in detail to the drawings, in FIG. 1 a picture frame embodying the invention is shown applied to a picture 10 and is designated generally at 12. The picture mount assemblage is designated generally at 14.

With particular reference to FIG. 2, the picture mount assemblage 14 includes a rigid backing member 16 together with such other elements as desired to make up the complete picture mount. In the illustrated assemblage, the entire picture mount comprises the rigid backing member 16 formed of plastic material such as Masonite, a thin filler sheet 17, a thin mat 18 and the usual front facing 20 formed of transparent plastic material or glass. The picture 10 is placed directly on the mat 18 and is thus held between the mat and the front facing 20. The front facing 20 may, however, be omitted as shown in FIG. 4.

The rigid backing member 16 serves as the support for the picture mount assemblage, and the picture frame 12 serves as a mechanical clamp for the assemblage and also as a decorative border. The picture frame 12 comprises individual frame elements 22, 24, 26, 28 formed of resilient plastic material, each of which is generally channel-shaped to be placed over a marginal portion of the picture mount assemblage, and each of which preferably has mitered ends, as shown at 30 and 32 to form the corners of the assembled frame. Each of the frame elements has a relatively wide front flange 34, a side flange 36, and a relatively narrow rear flange 38 having an inwardly extending lip 40 extending the length of the rear flange. The front flange 34 is curved and enlarged. As shown in FIG. 3, the backing member 16 has a groove 42 in its rear surface for each lip 40 of the frame elements. These grooves extend entirely across the backing member 16 and are spaced a like amount from adjacent edges 16' and are parallel to said edges.

When each frame element is applied to the picture mount assemblage, the lip 40 seats in the associated groove 42 so as to clamp the frame element to the mount assemblage. Under this condition, the front flange 34 lies flat against a front margin portion of the front facing 20. The side flange 36 of the frame element bears against the edge 16' of the backing member 16 and likewise against the edges of the mat 18 and the front facing 20. It is to be noted that the interior lip 40 engages the groove 42 at the corner 42' thereof. The biasing of the edge of lip 40 as shown disposes flange 36 and flange 34 against the side edges and faces of the front facing 20, respectively. Thus, the rear flange 38 is stressed both in tension and in bending, with the resulting tight fit of the frame elements and the flush fit thereof at the mitered corner joints.

In accordance with the invention, the outer or upper surface of each rear flange 38 as viewed in FIG. 3 is indented as indicated at 46 at its juncture with the side flange 36, for its entire length, thereby weakening the rear flange at such point therealong. Such weakening permits the rear flange 38 to flex readily and to carry its lip 40 out of the associated groove 42 and out of engagement with the backing member 16 and also facilitates insertion of the lip 40 into locking engagement in the groove 42.

An important feature of the present invention is the means to produce a stand-off from a supporting wall and consequent shadow effect when the picture is hung on a wall, and also to help rigidify the frame element and to facilitate handling. For these purposes, the rear flange 38 of each frame element continues into a curved extension 48, constituting an abutment adapted to abut against the supporting wall. The extensions serve to reinforce and rigidify the frame elements. Another advantage of the extensions is that they space the picture frame away from the wall and provide a pleasing shadow effect.

In applying the frame elements to the picture mount assemblage, three of the frame elements may be applied successively simply by sliding each frame element along a marginal portion of the mount assemblage, with the lip 40 disposed in the associated groove 42. The fourth frame element is then applied by inserting the lip 40 thereof in the associated groove 42 and forcing the frame element over the marginal portion of the picture mount assemblage. This operation is possible because each of the frame elements is formed of resilient material. In applying the fourth frame element, the element becomes distorted but it springs back toward its normal condition when it is in place on the picture mount assemblage. Removal of the picture frame elements from the mount assemblage involves a reversal of this procedure. One of the frame elements is removed by forcing it off of the marginal portion of the mount assemblage and then the remaining three picture frame elements are successively removed by sliding them off of the picture mount assemblage. The invention eliminates the necessity for the use of nails or tape.

The frame elements may be formed of any suitable material preferably of plastic material such as cellulose, butyrate or acetate butyrate. The material of the frame elements may be either clear or colored.

The rigid backing member 16 may be made of any suitable material such as molded plastic, tempered Masonite and the like. The grooves in the backing member may be made by milling or in any other suitable manner. The mat 20 may also be made of any suitable material such as stiff paper and the like and may be colored. The filler sheet 17 may be formed by any suitable plastic or cardboard and may be colored.

It will thus be seen that the present invention provides a complete frame assemblage which has the various advantages hereinbefore set forth.

While I have illustrated and described the preferred embodiments of my invention, it is to be understood that I do not limit myself to the precise construction herein disclosed and that various changes and modifications may be made within the scope of the invention as defined in the appended claim.

Having thus described my invention, what I claim as new, and desire to secure by United States Letters Patent is:

A picture frame and mount combination comprising a picture mount assembly including a rigid rectangular backing member, a plurality of similar grooves formed in the rear surface of said backing member one of said grooves being disposed a predetermined distance from and parallel to each side edge of said backing member and extending the entire width of said backing member between opposed edges thereof, and a picture frame comprising a plurality of similar elongated channel-shaped individual frame elements of resilient material, one of which is applied to each edge of said mount assembly; each of said frame elements comprising a base section for engagement with a side edge of said mount assembly, a front flange for engagement with the front surface of said mount assembly, and a rear flange for engagement with the rear surface of said backing member, each end of said element being beveled to form a miter joint with an element disposed normal thereto, said rear flange having an inwardly projecting wedge-shaped lip integral therewith for engagement in an associated one of said grooves to clamp said element in place on said mount assembly; the free end of said rear flange beyond said lip terminating in an elongated arcuate section which is coextensive with said rear flange and extends inwardly of said frame and rearwardly from said backing member, the said arcute sections of each of said elements forming with each other an unbroken annular wall which extends rearwardly from said backing member when one of said elements is applied to each edge of said mount assembly.

References Cited by the Examiner

UNITED STATES PATENTS

| | | | |
|---|---|---|---|
| 1,901,902 | 3/33 | Draper | 40—154 |
| 1,904,318 | 4/33 | Lehere | 40—154 |
| 2,777,232 | 1/57 | Kulicke et al. | 40—155 |
| 2,972,201 | 11/61 | Niedermayer | 40—11 X |
| 3,060,606 | 10/62 | Peach | 40—154 |

FOREIGN PATENTS

| | | |
|---|---|---|
| 280,787 | 5/52 | Switzerland. |
| 350,770 | 1/61 | Switzerland. |

EUGENE R. CAPOZIO, *Primary Examiner.*

JEROME SCHNALL, *Examiner.*